(12) United States Patent
Vaccaro et al.

(10) Patent No.: US 7,508,971 B2
(45) Date of Patent: Mar. 24, 2009

(54) INSPECTION SYSTEM USING COORDINATE MEASUREMENT MACHINE AND ASSOCIATED METHOD

(75) Inventors: Christopher M. Vaccaro, O'Fallon, MO (US); Nancy L. Wood, Clayton, MO (US)

(73) Assignee: The Boeing Company, Chicago, IL (US)

( * ) Notice: Subject to any disclaimer, the term of this patent is extended or adjusted under 35 U.S.C. 154(b) by 685 days.

(21) Appl. No.: 10/856,265

(22) Filed: May 28, 2004

(65) Prior Publication Data

US 2005/0276466 A1 Dec. 15, 2005

(51) Int. Cl.
  *G06K 9/00* (2006.01)
(52) U.S. Cl. ...................................... 382/141
(58) Field of Classification Search ................ 73/865.8, 73/866.5; 116/52; 369/53.15; 382/141, 382/149, 152; 700/110, 262; 702/35, 38, 702/39, 40, FOR. 125; 901/10, 15, 28, 33, 901/44, 46, 47; 33/503–505
  See application file for complete search history.

(56) References Cited

U.S. PATENT DOCUMENTS

| | | | | |
|---|---|---|---|---|
| 4,145,680 A | * | 3/1979 | Smith | ............................. 367/7 |
| 5,198,990 A | | 3/1993 | Farzan et al. | |
| 5,396,890 A | * | 3/1995 | Weng | .......................... 600/443 |
| 5,511,425 A | | 4/1996 | Kleinert et al. | |
| 5,581,166 A | * | 12/1996 | Eismann et al. | ......... 318/568.22 |
| 6,222,338 B1 | * | 4/2001 | Villaret | ................... 318/568.13 |
| 6,366,831 B1 | | 4/2002 | Raab | |
| 6,378,387 B1 | * | 4/2002 | Froom | ........................ 73/865.8 |
| 2002/0059041 A1 | * | 5/2002 | Mills | ........................... 702/127 |
| 2004/0040166 A1 | | 3/2004 | Raab et al. | |
| 2005/0150300 A1 | * | 7/2005 | Nenno et al. | .................... 73/618 |

FOREIGN PATENT DOCUMENTS

JP 6-243367 9/1994

OTHER PUBLICATIONS

Quality Digest, Nondestructive Testing, 2003 Quality Sourcebook, p. 1 [Retrieved on Oct. 22, 2007]. Retrieved from the Internet:<URL: http://www.qualitydigest.com/pdfs/2002ndt.pdf>.*

(Continued)

*Primary Examiner*—Sherali Ishrat
(74) *Attorney, Agent, or Firm*—Alston & Bird LLP

(57) ABSTRACT

A system and method for identifying defects in a workpiece are provided. The system includes a sensor for non-destructive testing. The system also includes a movable arm carrying the sensor and being pivotally attached to a base. The movable arm includes at least one pivotable joint between the base and the sensor, and is capable of being moved such that the sensor acquires data indicative of a workpiece as the sensor travels proximate to the workpiece. A data acquisition system is capable of communicating with the sensor to create an image of at least a portion of the workpiece based on the data acquired by the sensor.

18 Claims, 2 Drawing Sheets

OTHER PUBLICATIONS

Figure 1:
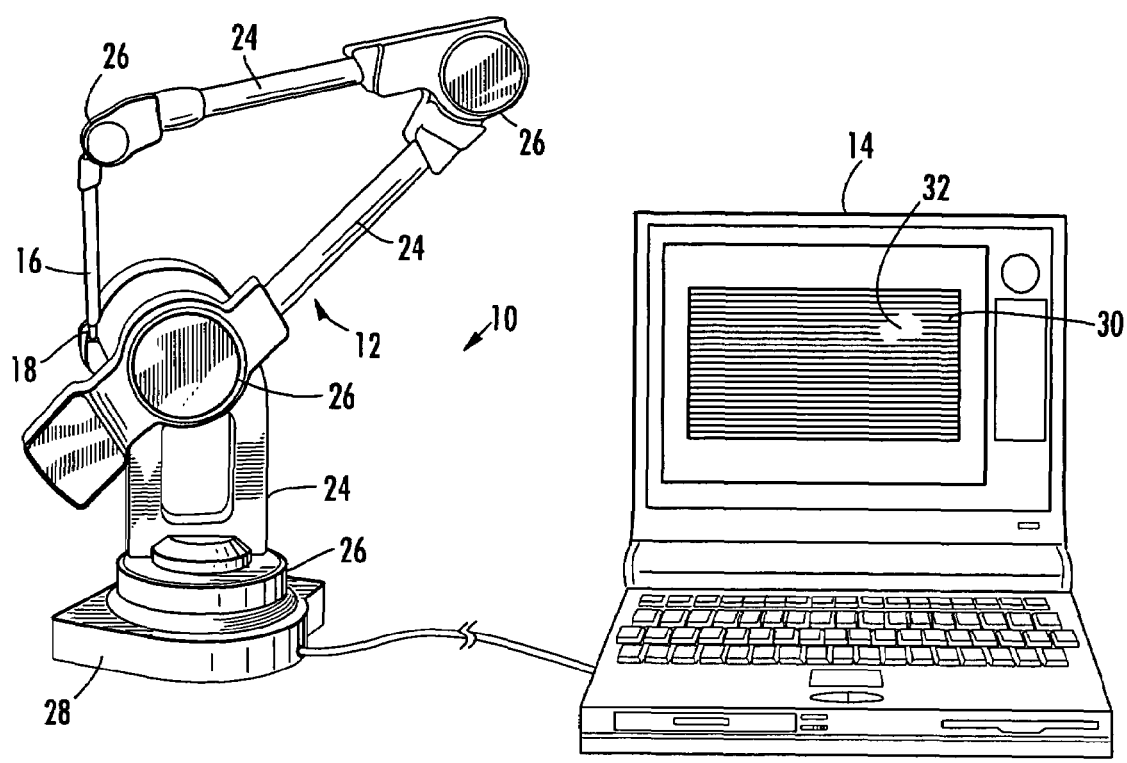

Kim Dismukes, Space Station Extravehicular Activity, Mar. 4, 2004, NASA, [Retrieved on Oct. 23, 2007]. Retrievd from the Internet:<URL: http://spaceflight.nasa.gov/station/eva/robotics.html>.*

Philip Yancey, Reaching for the Invisible God: What Can We Expect to Find?, Aug. 4, 2000, Zondervan Corporation, p. 139, [retreived on Jan. 10, 2008]. Retrieved from the Internet:<URL:http://books.google.com/books?id=eQ83ESmPIH4C&pg=PA139&Ipg=PA139&dq=egyptian+magnifying+glass&source=web&ots=BtE-i__wjvt&sig=zjGzEFyMFrHIIIaHKHm7cDyaVKc>.*

Immersion® MicroScribe™ G2 Desktop Digitizing Systems Datasheet, 2003, <http:///www.immersion.com/pdf/microscribe_G2_datasheet.pdf>.

Immersion Corporation—Digitizer: Products, 2004, <http://www.immersion.com/digitizer/products/microscribe_g2.php>.

Immersion—Online Demo—"How it Works—the MicroScribe™ digitizing process," 2003, <http://www.immersion.com/digitizer/products/online_demo.php>.

* cited by examiner

INSPECTION SYSTEM USING COORDINATE MEASUREMENT MACHINE AND ASSOCIATED METHOD

BACKGROUND OF THE INVENTION

1) Field of the Invention

The present invention relates to non-destructive inspection and, more particularly, to non-destructive inspection of a workpiece for defects using an inspection system in conjunction with a coordinate measurement machine and data acquisition system, as well as an associated method.

2) Description of Related Art

Non-destructive testing of structures involves thoroughly examining a structure without harming, or requiring significant disassembly of, the structure. Non-destructive testing is advantageous for many applications in which a thorough inspection of the exterior and/or interior of a structure is required. For example, non-destructive testing is commonly utilized in the aircraft industry to inspect aircraft structures for any type of internal or external damage to the structure. Metallic aircraft structures are typically inspected for corrosion and/or cracking, particularly near fasteners in the structure. Composite structures are typically inspected for any type of damage, such as delamination, occurring anywhere on or within the composite material.

Various types of sensors may be utilized to perform non-destructive testing. One or more sensors may move over the portion of the structure to be examined, and receive data regarding the structure. For example, ultrasonic testing could be used to generate a sound wave through a sensor or probe that is directed towards a part. When there is a flaw in the part, part of the sound wave will reflect back from the flaw and will be detected. A pulse-echo sensor may be utilized to obtain ultrasonic data, such as thickness gauging, detection of laminar defects and porosity, and/or crack detection in the structure. Resonance, pitch/catch or mechanical impedance sensors may be utilized to provide indications of voids or porosity, such as in adhesive bondlines of the structure. In addition, single and dual current eddy current probes, utilizing electromagnetic induction, impart and detect eddy currents within a structure so as to identify cracks and/or corrosion, particularly in metallic or other conductive structures. The data acquired by the sensors is typically processed by a processing element, and the processed data may be presented to a user via a display.

Current portable inspection systems may be automatic or manual. For example, automatic scanners such as the Mobile Automated Scanner (MAUS®) system, developed by The Boeing Company, are proficient in inspecting relatively flat parts such as wing and fuselage skins. One type of MAUS® system automatically moves along the structure via strategically controlled suction cups, while another type includes handheld sensors and an associated carriage that is moved along the structure via manual motion. As such, the MAUS® system not only scans the part, but also processes the data regarding the structure, and associates the data with the exact location on the part from where the data was obtained. The data is used to create C-scans and B-scans so that flaws or other items of interest may be detected on the surface of the part.

Manual inspection systems such as the USN60 (GE Inspection Technologies) and the Epoch III (Panametrics, Inc.) are typically used for portable inspection of in-service and as-manufactured parts, but are only capable of producing an A-scan output inspection. A-scans are less desired as customers become concerned about the probability of detecting a defect when employing the manual inspection of fracture and durability (F/D) parts, which puts the part in jeopardy of being not approved for use. Thus, current manual inspection systems are incapable of producing a more accurate C-scan or B-scan for small to midsize complex shaped parts.

Furthermore, a Coordinate Measurement Machine (CMM) such as that disclosed in U.S. Pat. No. 6,366,831 to Raab includes a portable CMM that implements an articulating arm and software interface. The arm is multijointed and includes a transducer that may be manually positioned for measuring a part. A controller is used as an interface between the transducer and a computer. In use, an experienced human operator directs the transducer along a desired tool path or the path to be traversed during a manufacturing operation on an existing part to produce data that is transferred to a computer numerically controlled (CNC) device. The CNC device uses the data to reproduce the profile of the part emulated by the CMM on a workpiece.

It would therefore be advantageous to provide an inspection system that is capable of producing C-scans and B-scans. Finally, it would be advantageous to provide an inspection system that is portable and capable of inspecting workpieces having complex shapes.

BRIEF SUMMARY OF THE INVENTION

The invention addresses the above needs and achieves other advantages by providing an inspection system capable of generating various scans for inspecting a workpiece. The inspection system incorporates a portable coordinate measurement machine and data acquisition system to produce, in some embodiments, C-scans, which increases the probability of detecting a defect in a workpiece.

In one embodiment, a system for identifying defects in a workpiece is provided. The system includes a sensor for non-destructive testing, such as an ultrasonic or eddy current sensor. The system also includes a movable arm carrying the sensor and being pivotally attached to a base. The movable arm includes at least one pivotable joint between the base and the sensor, and is capable of being moved, either manually or automatically, such that the sensor acquires data indicative of a workpiece as the sensor travels proximate to the workpiece. In one embodiment, there are a plurality of pivotable joints arranged along the movable arm. The movable arm is capable of being moved such that the sensor acquires data indicative of a workpiece as the sensor travels proximate to the workpiece. A data acquisition system is capable of communicating with the sensor to create an image of at least a portion of the workpiece based on the data acquired by the sensor. The image could be a two-dimensional or three-dimensional C-scan, wherein the images provide information for detecting a defect in the workpiece.

The present invention also provides a method for identifying defects in a workpiece utilizing a sensor carried by a movable arm that is pivotally attached to a base and that includes at least one pivotable joint between the base and the sensor. The method includes moving the sensor, either manually or automatically, proximate to a workpiece with the movable arm, and acquiring data indicative of the workpiece by the sensor. Further, the method includes communicating the data acquired by the sensor to a data acquisition system, and then creating an image, such as a two-dimensional or three-dimensional C-scan, of at least a portion of the workpiece with the data acquisition system based on the data acquired by the sensor.

In another aspect of the present invention, a system for identifying defects in a workpiece is provided. The system includes a sensor, such as an ultrasonic or eddy current sensor. The system also includes a movable arm carrying the sensor and being pivotally attached to a base. The movable arm includes at least one pivotable joint between the base and the sensor, and is capable of being moved, either manually or automatically, such that the sensor acquires data indicative of a workpiece as the sensor travels proximate to the workpiece. In one embodiment, there are a plurality of pivotable joints arranged along the movable arm. The movable arm is capable of being moved such that the sensor acquires data indicative of a workpiece as the sensor travels proximate to the workpiece. In addition, the system includes a data acquisition system capable of creating a C-scan, which could be two-dimensional or three-dimensional, of at least a portion of the workpiece based on the data acquired by the sensor.

The present invention therefore provides an inspection system capable of generating A-scan, B-scan, and C-scan images that increase the probability of detecting a defect in a workpiece. Increasing the probability of detecting a defect increases the reliability of the inspection system. The data acquisition system generates images that permit the inspection of a critical or complex workpiece to be monitored, such as by a vendor or supervisor. In addition, the CMM, including one movable arm, provides several degrees of freedom, which allows the sensor to be moved along workpieces of various dimensions and materials. The inspection system is advantageously portable so that it may be used in a variety of locations and even remotely from a central inspection location.

BRIEF DESCRIPTION OF THE SEVERAL VIEWS OF THE DRAWING(S)

Figure 2:
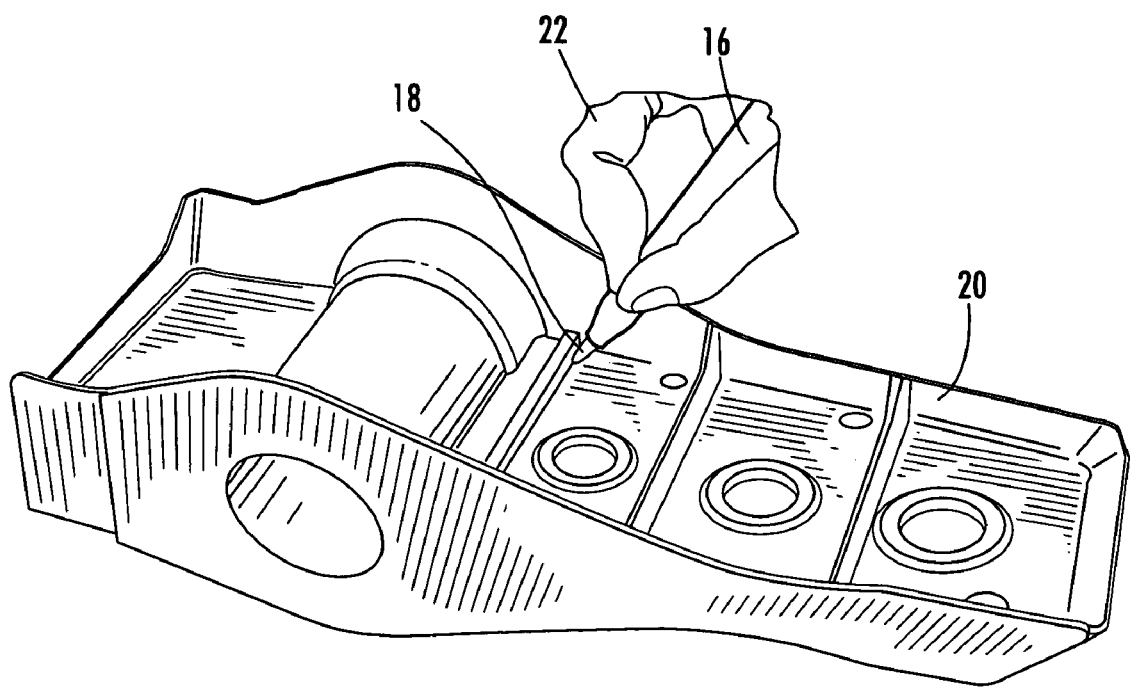

Having thus described the invention in general terms, reference will now be made to the accompanying drawings, which are not necessarily drawn to scale, and wherein:

FIG. 1 is a perspective view of an inspection system according to one embodiment of the present invention; and FIG. 2 is a perspective view of the inspection system of FIG. 1 inspecting a workpiece.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Referring now to the drawings and, in particular to FIGS. 1-2, there is shown an inspection system 10. The inspection system 10 includes a coordinate measurement machine (CMM) 12 in communication with a data acquisition system 14. As a sensor 18, carried by a stylus 16, is moved along a workpiece 20, data is sent to the data acquisition system 14 for processing. Typically, a user 22 manually holds the stylus 16 while moving the sensor 18 proximate to the workpiece 20, while the data acquisition system 14 generates images of the surface of the workpiece to map the sensor's response. The inspection system 10 could be used to inspect any number of workpieces 20 in a variety of industries where detection of flaws or defects in the workpiece is required, such as in the aircraft, automotive, or construction industries.

CMM's, such as that shown in FIG. 1, have typically been developed for producing three-dimensional profiles of workpieces 20. The CMM generally includes multiple-axis movement capabilities and uses software support to generate the three-dimensional profile to be used for measurement and inspection of parts.

In particular, the CMM 12 shown in FIG. 1 includes several arms 24 pivotally connected to one another at cooperative pivots 26, with one arm also pivotally attached to a base 28. The base 28 could be mounted to a desk, tripod, or any suitable surface. Therefore, the combination of the arms 24 and pivots 26 provides several degrees of freedom, which in turn, allows the stylus 16 to move the sensor 18 in any number of locations and directions. The arms 24 are typically lightweight, while the pivots 26 include bearings that provide a user-friendly CMM 12. In addition, the CMM 12 provides positional information (X, Y, and Z in three-dimensional space) to the data acquisition system 14 for accurately locating the sensor 18 along the workpiece 20. As such, the CMM 12 provides an accurate location of any defects detected during inspection of the workpiece 20. The CMM 10 could be differently sized depending on the type of workpiece 10 inspected, and is generally easily manipulated so that the stylus 16 is moved along the workpiece with minimal effort. The CMM 10 is portable so that it may be used at different locations or within a lab, and may even be used remotely to conveniently inspect workpieces 20 onsite to reduce the amount of downtime typically required to transport the workpiece to a central inspection location. An example of a CMM 12 that could be employed with the present invention is the MicroScribe™ G2 (Immersion Corporation, San Jose, Calif.), although any CMM capable of carrying a stylus 16 and communicating with a data acquisition system 14 could be used.

The data acquisition system 14 is capable of generating various images, including A-scan, B-scan, and C-scan images of complex shaped workpieces 20 based on data collected by the sensor 18. As known to those skilled in the art, an A-scan image is simply an image of the amount of energy received by the sensor as a function of time, while a B-scan provides a profile or cross-sectional view of the workpiece 20. A C-scan image, which is known in the art as a plan view of the location and size of a portion of the workpiece 20 inspected, may be two-dimensional or three-dimensional, and may include data indicative of the workpiece on the surface or within the workpiece itself. The data may include, among other information, data regarding defects, irregularities, or other imperfections in the workpiece 20. Generally, the plane of the C-scan created is parallel to the scan pattern of the sensor 18. Thus, as shown in FIG. 1 for example, the image shown is a C-scan, which results from moving the sensor 18 side-to-side across a portion of the workpiece 20 (i.e, the horizontal lines 30 shown on the display), while also indexing the sensor so that an area of the workpiece is scanned by the sensor so that a defect may be detected (i.e., white portion 32 shown on the display).

The data acquisition system 14 typically includes a processor or similar computing device operating under the control of imaging software so that any defects in the workpiece may be presented on a display. It is possible to incorporate the data acquisition system 14 without a display and to instead provide a printout of the image scan, or to utilize any other technique for viewing the scan and location data. The processor could be embodied by a computer such as a desktop, laptop, or portable processing device capable of processing the data generated by the sensor 18 and creating an image of the scanned data that is shown on a display such as a monitor or other viewing device. The data acquisition system 14 generates images of the scans and also allows a user to store and edit previously created images. Therefore, a permanent record of the images may be kept for future use or record keeping. An example of software compatible with the data acquisition system 14 of the present invention is Imagin software developed by The Boeing Company (the present assignee) that is currently used with a Mobile Automated Scanner (MAUS®, The Boeing Company).

The sensor 18 could be any suitable sensor capable of generating information for inspecting a workpiece 20, and could be attached to the stylus 16 using any suitable technique, such as with various fasteners. The sensor 18 is typically a non-destructive sensor, such that the sensor is capable of inspecting a workpiece 20 without harming the workpiece or requiring disassembly of the workpiece. In the embodiment of the inspection system 10 shown in FIG. 1, the sensor 18 is an eddy current sensor. Single and dual eddy current sensors are capable of detecting cracks and/or corrosion, particularly in metallic or other conductive workpieces 20. Other examples of sensors 18 are pulse-echo, thru-transmission, shear wave, resonance, pitch/catch, mechanical impedance, and ultrasonic array sensors. Pulse-echo, thru-transmission and shear wave sensors 18 provide ultrasonic data, such as for thickness gauging, detection of laminar defects and porosity, and/or crack detection in the workpiece 20. Resonance, pitch/catch or mechanical impedance sensors 18 provide indications of voids or porosity, such as in adhesive bondlines of the workpiece 20. Furthermore, the sensors 18 could employ lasers, wherein the light reflectivity is affected by any inconsistencies in the workpiece 20, and the reflectivity changes are interpreted by the data acquisition system 14.

The sensor 18 is typically in communication with the data acquisition system 14 to process the data accumulated by the sensor and to display the processed data. In many cases, communications cable(s) transmit data between the sensor 18 and the data acquisition system 14. In other embodiments, the data may be transmitted between the sensor 18 and the data acquisition system 14 via wireless communications. The sensor 18 may be directly connected to the processor, or indirectly connected, such as via a network. In further embodiments of the present invention the data acquisition system 14 may be located proximate to the sensor 18, such that remote connections between the sensor and data acquisition system are not necessary.

FIG. 2 demonstrates that the sensor 18 can be moved by a user 22 along complex workpieces 20 to inspect for flaws. Thus, the user 22 typically manually moves the stylus 16 and sensor 18 along the workpiece 20 and may pivot or rotate each of the arms 24 about pivots 26 to move the sensor in various directions and positions along the workpiece. In general, the user 22 moves the sensor 18 side-to-side in one direction while also indexing the sensor in another direction to scan a desired area of the workpiece 20. As shown in FIG. 1, the data acquisition system 14 includes a display illustrating a C-scan, as described earlier. The horizontal lines 30 on the display illustrate the path that the sensor 18 was moved across the workpiece 20, while the white portion 32 on the display illustrates a detected defect as a result of the sensor scanning the workpiece. Further, the sensor 18 is generally capable of moving over a smooth, relatively rough, and/or contoured surface while maintaining the desired orientation and contact with the workpiece 20, such as perpendicular to the workpiece. Although, FIG. 2 illustrates that the sensor 18 is moved manually, it is understood that the CMM 12 could be controlled automatically or by a combination of automated and manual movement, such as with the MAUS® system, developed by The Boeing Company (the current assignee).

The workpiece 20 shown in FIG. 2 is a pylon rib, with dimensions of approximately 10 inches wide, 10 inches high, and 28 inches long. The term "workpiece" is not meant to be limiting, as the inspection system 10 could be used to inspect any number of parts or structures of different shapes and sizes, such as machined forgings, castings, or composite parts including resin transferred molded parts which typically have a high degree of curvature. The inspection could be performed on newly manufactured workpieces 20, or existing workpieces that are being inspected for preventative maintenance purposes.

Thus, the present invention is capable of generating various images including A-scan, B-scan, and C-scan images that increase the probability of detecting a defect in the workpiece 20. Increasing the probability of detecting a defect increases the reliability of the inspection system 10. The data acquisition system 14 generates images that permit the inspection of a critical or complex workpiece 20 to be monitored, such as by a vendor or supervisor. In addition, the CMM 12 provides several degrees of freedom, which allows the sensor 18 to be adapted for inspecting workpieces 20 having complex shapes. Furthermore, the inspection system 10 is portable and accurate so that defects are conveniently depicted and located for repair and/or replacement of the workpiece 20.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for identifying defects in a workpiece comprising:
    a sensor for non-destructive testing, wherein the sensor is configured to provide a signal within a workpiece and acquire data indicative of the workpiece based on the signal;
    a movable arm carrying the sensor and being pivotally attached to a base, wherein the movable arm comprises at least one pivotable joint between the base and the sensor, wherein the movable arm is capable of being moved manually along the workpiece such that the sensor acquires data indicative of the workpiece as the sensor travels proximate to the workpiece, and wherein the sensor and movable arm are portable and configured to inspect the workpiece at one or more locations that are remote from a central inspection location;
    a stylus coupled to the sensor and the moveable arm, wherein a user is capable of grasping the stylus and manually moving the sensor along the workpiece such that the sensor acquires data indicative of the workpiece as the sensor travels proximate to the workpiece; and
    a data acquisition system comprising a computer processor and capable of communicating with the sensor such that the data acquisition system creates an image of at least a portion of the workpiece including any defects based on the data acquired by the sensor.

2. A system according to claim 1, wherein the data acquisition system creates an image in the form of a two-dimensional C-scan.

3. A system according to claim 1, wherein the data acquisition system creates an image in the form of a three-dimensional C-scan.

4. A system according to claim 1, wherein the sensor is an ultrasonic sensor.

5. A system according to claim 1, wherein the sensor is an eddy current sensor.

6. A system according to claim 1, wherein the movable arm comprises a plurality of pivotable joints between the base and the sensor.

7. A system according to claim 1, wherein the data acquisition system creates an image comprising information indicative of a defect in the workpiece.

8. A system according to claim 1, wherein the data acquisition system comprises a processor for creating the image.

9. A system for identifying defects in a workpiece comprising:
- a non-destructive testing sensor configured to provide a signal within a workpiece and acquire data indicative of the workpiece based on the signal;
- a movable arm carrying the sensor and being pivotally attached to a base, wherein the movable arm comprises at least one pivotable joint between the base and the sensor;
- a stylus coupled to the sensor and the moveable arm, wherein a user is capable of grasping the stylus and moving the sensor manually along the workpiece such that the sensor acquires data indicative of the workpiece as the sensor travels proximate to the workpiece; and
- a data acquisition system comprising a computer processor and capable of creating an image of at least a portion of the workpiece including any defects based on the data acquired by the sensor.

10. A system according to claim 9, wherein the data acquisition system creates a two-dimensional C-scan.

11. A system according to claim 9, wherein the data acquisition system creates a thee-dimensional C-scan.

12. A system according to claim 9, wherein the sensor is an ultrasonic sensor.

13. A system according to claim 9, wherein the sensor is an eddy current sensor.

14. A system according to claim 9, wherein the movable arm comprises a plurality of pivotable joints.

15. A system according to claim 9, wherein the data acquisition system creates a C-scan comprising information indicative of a defect in the workpiece.

16. A system according to claim 9, wherein the data acquisition system comprises a processor for creating the C-scan.

17. A system according to claim 9, wherein the sensor and movable arm are portable and configured to inspect a workpiece at one or more locations that are remote from a central inspection location.

18. A system according to claim 9, wherein the sensor is positioned in direct contact with the workpiece.

* * * * *